Aug. 2, 1932. O. C. REEVES ET AL 1,869,438
WEIGHING SCALE
Filed April 16, 1928   3 Sheets-Sheet 3
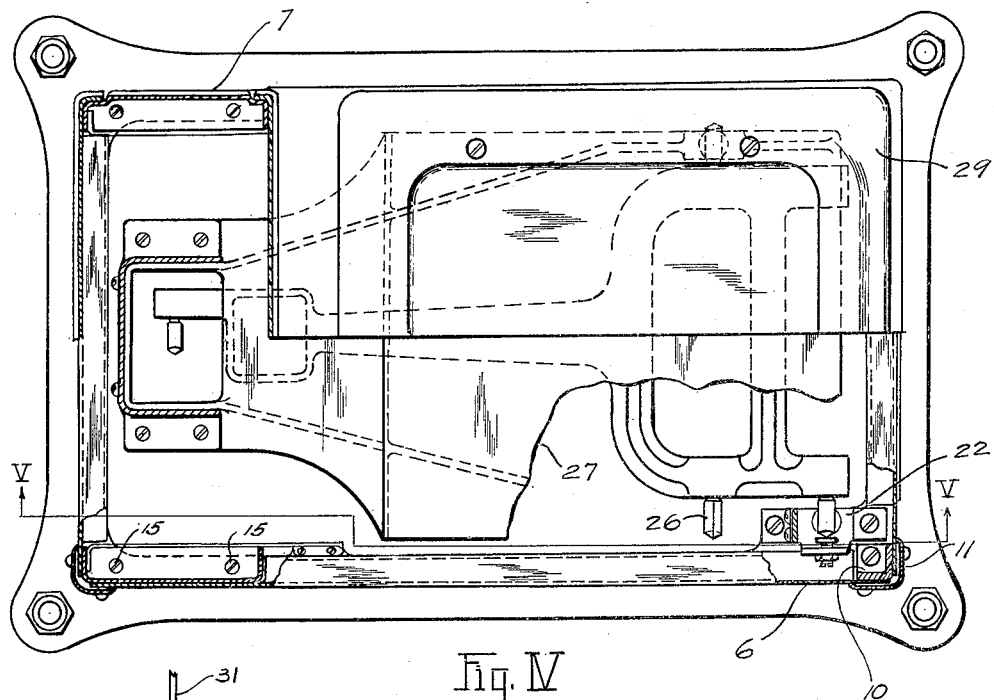
Fig. IV
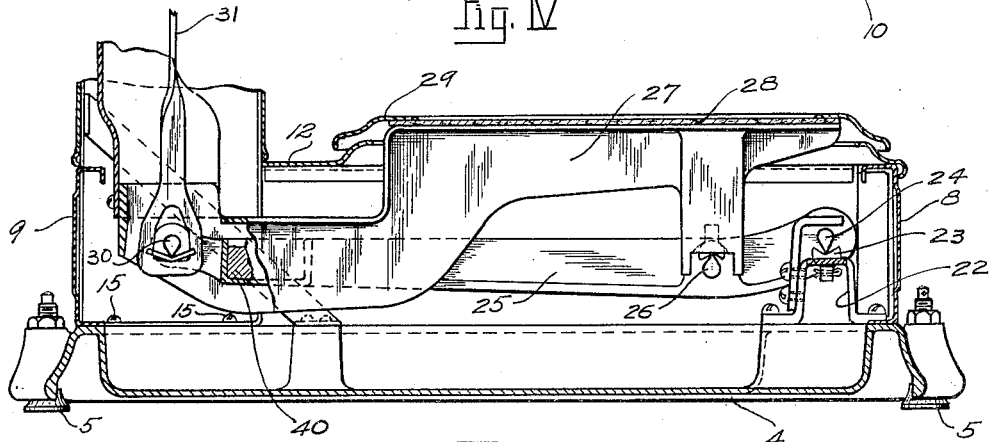
Fig. V
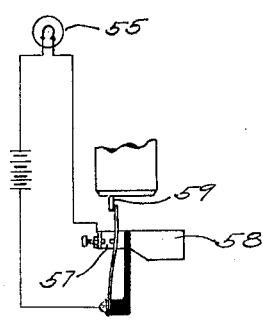
Fig. VI
Inventor
ORWELL C. REEVES
CHARLES O. MARSHALL
By C. O. Marshall
Attorney Patented Aug. 2, 1932

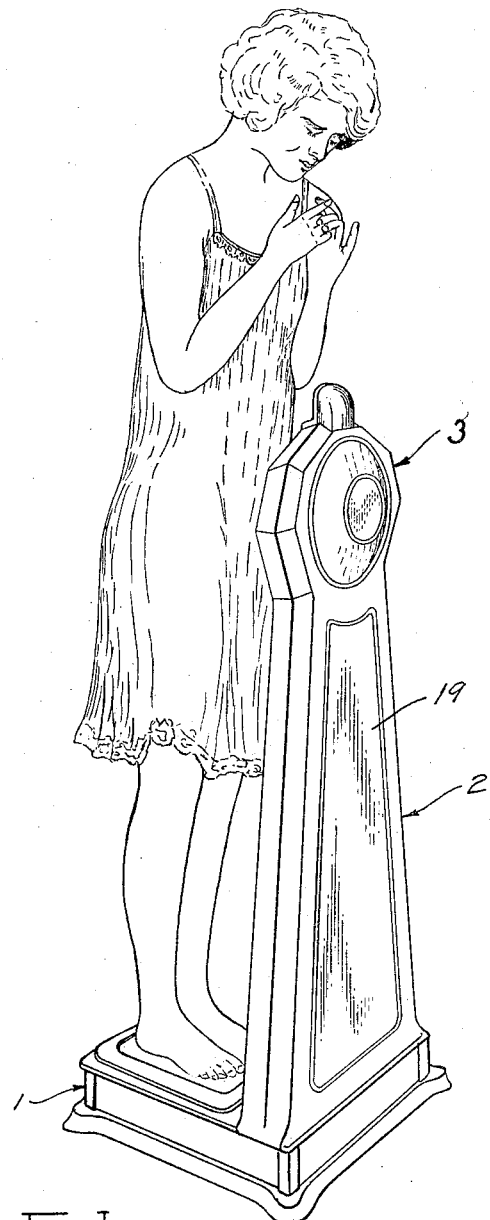

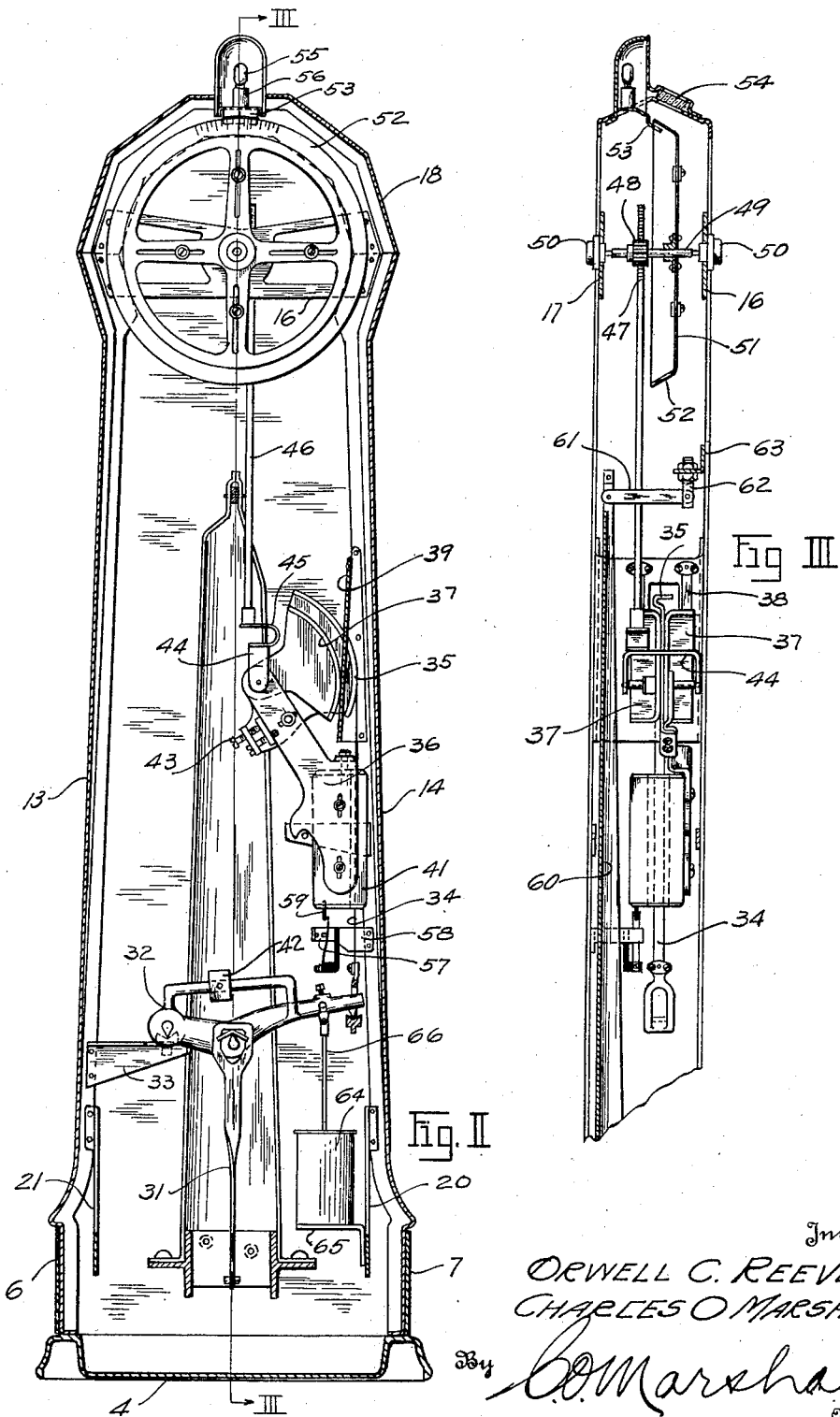

1,869,438

UNITED STATES PATENT OFFICE

ORWELL C. REEVES AND CHARLES O. MARSHALL, OF TOLEDO, OHIO, ASSIGNORS TO TOLEDO SCALE MANUFACTURING COMPANY, OF TOLEDO, OHIO, A CORPORATION OF NEW JERSEY

WEIGHING SCALE

Application filed April 16, 1928, Serial No. 270,207, and in Canada September 4, 1928.

This invention relates to weighing scales, and particularly to scales of the type known as person weighers.

One of the principal objects of the invention is to provide a scale of this type in which the indicator is so located that it may be read with the greatest ease;

Another object is the provision of a scale of this type in which the indication is ordinarily visible only to the person being weighed;

Another object is the provision of a scale of this type in which the indication is visible either to an adult or a child on the scale and in which errors of parallax are avoided;

Another object of the invention is the provision of a person weighing scale which is of dignified and attractive proportions and is so designed and constructed as to conform to the standards of elegance usual in well furnished homes;

Another object of the invention is to provide a weighing scale of this type having the strength and rigidity required for accurate weighing and which is yet light in weight and of inexpensive construction;

Still another object is the provision of a person weighing scale of such style and dimensions that it may be installed in homes either in a niche constructed to receive it or as a part of the furniture of a room; and Still another object is the provision of a scale of this type which may be rapidly and economically assembled from interchangeable parts which are capable of rapid, economical production.

Other objects and advantages will be apparent from the following description, in which reference is had to the accompanying drawings illustrating a preferred embodiment of our invention and wherein similar reference numerals designate similar parts throughout the several views.

In the drawings:—

Figure I is a view in perspective showing the person weighing scale of our invention in use;

Figure II is an enlarged view showing the load-counterbalancing and indicating mechanism in front elevation, the housing and other parts being shown in sections;

Figure III is a sectional view taken substantially on the line III—III of Figure II, the front and back housing plates being assembled;

Figure IV is a plan view showing the base mechanism of the scale, parts being broken away and parts shown in section;

Figure V is a sectional view taken substantially on the line V—V of Figure IV; and Figure VI is a wiring diagram.

Referring to the drawings in detail, the frame of the scale consists of a base housing 1 surmounted by an upright housing 2 adapted to support and enclose the load-counterbalancing mechanism of the scale and terminating at its upper end in a head 3 containing the indicating mechanism of the scale. The height of the upright housing 2 is such as to locate the indication at about the convenient height of a reading stand.

The base housing 1 comprises a base plate 4, preferably formed of cast metal, in which are mounted adjustable leveling feet 5. Side plates 6 and 7 and end plates 8 and 9, connected by means of inner corner members 10 and outer corner members 11, are mounted on the base plate 4, and mounted on the side and end members is a deck 12. The side and end plates, the corner members and the deck are all preferably stamped from sheet metal. The upright housing 2 consists of side members 13 and 14 which are fastened by means of screws 15 to the base plate 4 and are connected at their upper ends by a pair of bridge members 16 and 17, the bridge members 16 and 17 serving also to join the side members 13 and 14 to a cap 18. Removable front and back plates 19 serve to complete the upright housing. In order to make the joint between the upright housing and the base member 4 very rigid, the side members 13 and 14 and the base member 4 are additionally secured in fixed relation by means of braces 20 and 21.

Secured upon the base plate 4 is a pair of fulcrum stands 22 supporting self-aligning bearings 23, upon which lie the knife-edge fulcrum pivots 24 of a platform lever 25, which is also provided with load pivots 26 that support a combined spider and platform 27. The flat upper surface of the spider and platform 27 is provided with a mat 28 of linoleum or other suitable material surrounded by a molding 29.

The load pivots 26 are located nearer the end of the platform 28 upon which the heels of a person being weighed normally rest for the reason that the center of mass of a person standing upon the mat 28 is most likely to lie above the axis of the load pivots when they are so located. The nose pivot 30 of the lever 25 lies beneath the upright housing 2 and is connected by means of a link 31 to a lever 32 fulcrumed upon a bracket 33 within the housing 2.

The lever 32 is in turn connected by means of a flexible metallic ribbon 34 to the power sector 35 of a load-counterbalancing pendulum 36, the pendulum 36 being supported by means of fulcrum sectors 37 and flexible metallic ribbons 38 upon a sector guide 39 having a vertical face against which the ribbons 38 lie and upon which the fulcrum sectors 37 roll vertically upwardly when a load upon the spider and platform 27 acts through the platform lever 25, the link 31 and the lever 32 to exert a downward pull upon the ribbon 34, thus causing the pendulum 36 to swing to the left to a position in which the load is counterbalanced.

The initial balance of the parts is obtained by means of a loading box 40 and the counterbalancing effect of the pendulum 36 may be adjusted by moving the pendulum weight 41 upwardly or downwardly and then securing it in place by means of clamping screws. The lever 32 is also provided with an adjustable balance weight 42. In order to secure a uniform upward rolling movement of the fulcrum sectors 37 under uniformly increasing load, the power sector 35 is made slightly eccentric with respect to the fulcrum sectors and the angle of eccentricity may be adjusted by means of the adjusting screws 43. Pivotally connected to the pendulum 36 on an axis coinciding with the center of curvature of the fulcrum sectors 37 is a yoke 44, to which is secured by means of a shock absorbing connection 45 an upwardly extending rack rod 46, at the upper end of which is a rack 47 meshing with a pinion 48, which is mounted on a pinion shaft 49 journaled in ball bearings 50 which are mounted in the bridge members 16 and 17.

Secured upon the pinion shaft 49 is an indicating chart 51 having a peripheral flange 52 upon which are printed, or otherwise marked, weight figures and graduations. Secured within the cap 18 is a tab 53 having a portion lying substantially in an extension of the surface of the flange 52 and bearing an index mark which co-operates with the characters on the flange 52 to indicate the weight of the load upon the platform 28. The index mark on the tab 53 and the characters on the flange 52 are visible through a window 54 in the cap 18, which may, if desired, include a magnifying lens. The angle of the window 54 and the angle of the flange 52 and tab 53 is such that the characters on the flange 52 may be easily read from the normal position of a person standing upon the scale platform.

In order to increase the attractiveness of the scale and to make the weight indications more easily readable when the scale is in darkness or in a poorly illuminated location, a small lamp 55 is mounted in a socket 56 on the tab 53. A switch 57 supported on a bracket 58 is in the housing 2 and having a flexible member adapted to be engaged by a lug 59 on the pendulum weight 41 and held open when the scale is not under load is placed in a circuit with the lamp 55, so that whenever the scale is under load and the pendulum 36 swings away from its zero position, the switch is allowed to close and the lamp 55 is lighted, the indication thus being brilliantly illuminated.

The spider and platform 27 is kept level during weighing movements of the scale by means of a riser 60 and a link 61, one end of the link being pivoted to an adjustable stud 62 secured to an angle bar 63, which is in turn secured to and supported by the side members 13 and 14 of the upright housing 2, the other end of the link 61 being pivoted to the upper ends of the riser 60. The relation of the parts is such that the pivots at the ends of the link 61 and the fulcrum and load pivots of the platform lever 25 form a parallelogram. Owing to the length of the riser 60 the pressure on the pivots of the link 61 which is caused by load in front of or back of the load pivots 26 is not great.

In order to bring the mechanism quickly to rest in load indicating position when the platform is placed under load and to bring it quickly to rest in zero position when the load is removed, as well as to protect the mechanism from shocks and excessive vibration, a dash pot 64 is mounted on a shelf 65 supported within the upright housing 2 and the dash pot plunger is connected by means of a link 66 to the lever 32.

In the operation of the scale, when a person steps upon the mat 28 of the spider and platform 27, a downwardly acting force is exerted upon the load pivots 26 and transmitted through the platform lever 25 to the link 31. The downward force acting on the link 31 tends to swing the lever 32 about its fulcrum and exerts a downward force on the ribbon 34 which causes the pendulum 36 to swing to the left, thus rolling the fulcrum sectors 37 upwardly from the vertical face of the sector guide 39 and raising the rack 46. The upward movement of the rack 46 turns the pinion 48 and the chart 51, the position assumed by the chart corresponding to that taken by the load-counterbalancing pendulum 36 in counterbalancing the load on the platform. The weight characters on the flange 52 of the chart 51 are so arranged that the character corresponding to the weight of the load on the platform is automatically brought into registration with the index mark on the tab 53. As the pendulum 36 moves from zero position, the light 55 is lighted and the chart characters and index marks are brilliantly illuminated so that they may be read without effort by the person standing upon the scale. The arrangement disclosed herein brings the indication to the position in which it is most easily read by a person standing upon the platform and the arrangement is such that the indication cannot ordinarily be seen by bystanders.

The embodiment of our invention herein shown and described is to be regarded as illustrative only, and it is to be understood that the invention is susceptible to variation, modification and change within the spirit and scope of the subjoined claims.

Having described our invention, we claim:

1. In a weighing scale, in combination, a platform, an indicator operatively connected thereto, said indicator including a revoluble chart and co-operating index, the chart and index being so located as to lie in about waist high position in respect of a person of average height standing upon the scale platform, and means for illuminating the indicator when it is moved to indicating position.

2. In a weighing scale, in combination, a base housing, a platform overlying said base housing, an upright housing mounted on said base housing, said upright housing being approximately waist high with respect to a person of average height standing upon said platform, an indicator operatively connected to said platform and located in the upper end of said housing, and means whereby said indicator may be viewed through the top of said housing by a person standing upon said scale platform.

3. In a weighing scale, in combination, a base housing, a platform overlying said base housing, an upright housing mounted on said base housing, said upright housing being approximately waist high with respect to a person of average height standing upon said platform, an indicator operatively connected to said platform and located in the upper end of said housing, said indicator including a revoluble chart, and means whereby said indicator may be viewed through the top of said housing by a person standing upon said scale platform.

4. In a weighing scale, in combination, a platform lever supported within said base housing, a platform overlying said base housing and supported by said platform lever, an upright housing surmounting said base housing, a sector guide within said upright housing, single pendulum having a fulcrum sector adapted to roll along said sector guide, a rack, means pivotally connecting said rack to said pendulum at the center of curvature of said fulcrum sector, and an indicator operated by said rack.

5. In a weighing scale, in combination, an upright housing, a substantially vertical sector guide therein, a single pendulum having a fulcrum sector adapted to roll on said sector guide, a vertically movable rack, means connecting said rack to said pendulum at the center of curvature of said fulcrum sector, and a revoluble indicator located above said pendulum and operated by said rack.

6. In a weighing scale, in combination, a base housing, a platform lever supported therein, an upright housing surmounting said base housing, an intermediate lever supported in said upright housing, a sector guide in said upright housing, a pendulum having a fulcrum sector adapted to roll on said sector guide, means connecting said intermediate lever to said pendulum, a rack, means connecting said rack to said pendulum at the center of curvature of said fulcrum sector, and an indicator operated by said rack.

7. In a weighing scale, in combination, a base housing, a platform lever supported therein, a platform overlying said base housing and supported by said platform lever, an upright housing surmounting said base housing, a riser secured to said platform and extending upwardly within said upright housing, a link connecting the upper end of said riser and said upright housing, an intermediate lever fulcrumed within said upright housing, a link connecting said platform lever and said intermediate lever, a sector guide secured within said upright housing, a pendulum having a fulcrum sector adapted to roll on said sector guide, a rack, means for pivotally connecting said rack to said pendulum at the center of curvature of said fulcrum sector, a revoluble chart secured in said housing above said pendulum, and a pinion revoluble with said chart and meshing with said rack.

8. In a weighing scale, in combination, a base housing, a platform overlying said base housing, an upright housing surmounting said base housing, said upright housing being approximately waist high to a person of average height standing upon said platform, a sector guide supported within said upright housing, a pendulum having a fulcrum sector adapted to roll upon said sector guide, a rack pivotally connected to said pendulum at the center of curvature of said fulcrum sector, and a revoluble chart located in the upper end of said upright housing and adapted to be operated by said rack.

ORWELL C. REEVES.
CHARLES O. MARSHALL.